(12) United States Patent
Summons et al.

(10) Patent No.: US 9,603,487 B2
(45) Date of Patent: Mar. 28, 2017

(54) SELF-CLEANING DEADWEIGHT HOLDER FOR FRYER APPARATUS

(71) Applicant: Henny Penny Corporation, Eaton, OH (US)

(72) Inventors: Gary F. Summons, Trotwood, OH (US); Brian K. Brooks, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 92 days.

(21) Appl. No.: 14/420,338

(22) PCT Filed: Aug. 8, 2013

(86) PCT No.: PCT/US2013/054209
§ 371 (c)(1),
(2) Date: Feb. 6, 2015

(87) PCT Pub. No.: WO2014/026046
PCT Pub. Date: Feb. 13, 2014

(65) Prior Publication Data
US 2015/0208866 A1 Jul. 30, 2015

Related U.S. Application Data

(60) Provisional application No. 61/681,113, filed on Aug. 8, 2012.

(51) Int. Cl.
*A47J 37/12* (2006.01)
*F16M 1/026* (2006.01)
(Continued)

(52) U.S. Cl.
CPC .......... *A47J 37/1276* (2013.01); *A47J 36/38* (2013.01); *A47J 37/0611* (2013.01);
(Continued)

(58) Field of Classification Search
CPC .................................................. A47J 37/1276
See application file for complete search history.

(56) References Cited

U.S. PATENT DOCUMENTS

| 854,643 A | 5/1907 | Hartnett et al. |
| 1,996,098 A * | 4/1935 | Chase .................... A01G 13/06 126/9 B |

(Continued)

FOREIGN PATENT DOCUMENTS

| CN | 1240910 A | 1/2000 |
| CN | 2820032 Y | 9/2006 |

OTHER PUBLICATIONS

State Intellectual Property Office of the People's Republic of China, First Office Action, Patent Application No. CN 201380046052.6, mailed Mar. 25, 2016.

(Continued)

*Primary Examiner* — Joshua J Michener
*Assistant Examiner* — Chiedu Chibogu
(74) *Attorney, Agent, or Firm* — Wood Herron & Evans LLP

(57) ABSTRACT

The invention relates to a self-cleaning deadweight holder configured to hold a deadweight within a cooking apparatus. In some embodiments, the holder may comprise a top plate, an exhaust cylinder, a bottom plate, a plurality of support plates, and a plurality of guide plates. The top plate may include a through hole disposed at substantially a center of the top plate and configured to allow at least one of liquid and steam to pass therethrough. An outer diameter of the bottom plate may be less than an outer diameter of the top plate and an outer diameter of each of the plurality of guide plates, and the plurality of guide plates may be configured to permit movement of the deadweight therethrough. In some embodiments, the cooking apparatus may comprise a cook- (Continued)

ing chamber, a steam box, a vent tube, an exhaust tube, a drain tube, and a pressure relief tube.

15 Claims, 6 Drawing Sheets

(51) Int. Cl.
*F16M 1/08* (2006.01)
*A47J 36/38* (2006.01)
*A47J 37/06* (2006.01)
*A47J 27/092* (2006.01)

(52) U.S. Cl.
CPC ....... *A47J 37/1266* (2013.01); *A47J 37/1271* (2013.01); *F16M 1/026* (2013.01); *F16M 1/08* (2013.01); *A47J 27/092* (2013.01); *A47J 37/128* (2013.01); *A47J 37/129* (2013.01); *A47J 37/1219* (2013.01); *A47J 2037/0617* (2013.01)

(56) References Cited

U.S. PATENT DOCUMENTS

| | | | | |
|---|---|---|---|---|
| 3,782,267 A | * | 1/1974 | Moore | A47J 27/0817 422/297 |
| 4,612,910 A | * | 9/1986 | Williams | A01K 97/01 126/350.1 |
| 4,941,400 A | | 7/1990 | Moore | |
| 5,317,964 A | * | 6/1994 | Prudhomme | A47J 43/24 210/369 |
| 5,439,349 A | | 8/1995 | Kupferberg | |
| 5,782,164 A | * | 7/1998 | Brintle | A23L 1/0107 99/330 |
| D561,530 S | | 2/2008 | Florkey et al. | |
| 8,542,987 B2 | * | 9/2013 | Yen | F24H 3/00 126/110 B |
| 2008/0289614 A1 | | 11/2008 | Carradinha | |
| 2010/0242460 A1 | | 9/2010 | Sponsky et al. | |
| 2013/0255413 A1 | * | 10/2013 | Liu | A47J 37/1219 74/89.37 |

OTHER PUBLICATIONS

European Patent Office, Extended European Search Report in EP Patent Application No. 13827358.6, mailed Dec. 14, 2015.
United States Patent and Trademark Office, International Search Report and Written Opinion for International Application No. PCT/US2013/054209 (counterpart to above-captioned patent application), dated Jan. 14, 2014.

* cited by examiner

SELF-CLEANING DEADWEIGHT HOLDER FOR FRYER APPARATUS

CROSS-REFERENCE TO RELATED APPLICATIONS

This application is a U.S. National Stage Patent Application under 37 U.S.C. §371 of International Patent Application No. PCT/US2013/054209, filed on Aug. 8, 2013, which claims priority from U.S. Provisional Patent Application No. 61/681,113, filed on Aug. 8, 2012, each of which are incorporated herein by reference.

BACKGROUND OF THE INVENTION

1. Field of the Invention

The invention relates generally to a deadweight assembly for maintaining a predetermined pressure within a cooking chamber that is self-cleaning and prevents seizing of a deadweight, and a cooking apparatus including such a deadweight assembly.

2. Description of Related Art

In a fryer apparatus with a deadweight assembly, a deadweight disposed within the deadweight assembly may be used to regulate pressure in the fryer apparatus in conjunction with vapor released through a vent pipe of the fryer apparatus into a steam box containing the deadweight assembly. Known deadweight assemblies may include cup-and-cap designs used to regulate pressure.

However, due to the large surface area of contact between the deadweight holder and the deadweight in these known assemblies, these assemblies often require daily removal and cleaning of the deadweight and deadweight holder in order to ensure against operational impairment such as "seizing," which is a situation in which the deadweight binds to the deadweight holder and ceases to function. Such daily care is undesirable since it may be costly, inefficient, and failing to perform daily cleaning may result in damage and impairment of the deadweight assembly and the fryer apparatus. Moreover, such seizing due to buildup may limit the effectiveness of the deadweight to maintain a desirable pressure in the cooking chamber, which may adversely affect the quality of a cooked food product.

SUMMARY OF THE INVENTION

Therefore, a need has arisen for self-cleaning deadweight holders that reduce the build-up of constricting oil and/or grease and prevents the deadweight from seizing, and cooking apparatuses including such deadweight assemblies, which overcome these and other shortcomings of the related art.

In an embodiment of the invention, a holder may be configured to hold a deadweight within a steam box of a cooking apparatus. The holder may comprise a top plate, an exhaust cylinder, a bottom plate, a plurality of support plates, and a plurality of guide plates. The top plate may include a through hole disposed at substantially a center of the top plate, the through hole being configured to allow at least one of liquid and steam to pass therethrough; a first surface; and a second surface, wherein the first surface is opposite the second surface. The exhaust cylinder may be attached to the first surface of the top plate. The plurality of support plates may include a first end of each of the plurality of support plates that is attached to and extends from the second surface of the top plate in a direction substantially perpendicular to the second surface, and a second end of each of the plurality of support plates that is attached to the bottom plate. The plurality of guide plates may be disposed between the top plate and the bottom plate, and each of the plurality of guide plates may be attached to the plurality of support plates. In addition, the bottom plate may include a third surface and a fourth surface, the third surface being opposite of the fourth surface, and the third surface of the bottom plate may be substantially parallel to the first surface of the top plate. Moreover, an outer diameter of the bottom plate may be less than an outer diameter of the top plate and an outer diameter of each of the plurality of guide plates, and the plurality of guide plates may be configured to permit movement of the deadweight therethrough.

In another embodiment of the invention, a cooking apparatus may comprise a cooking chamber, a steam box, a vent tube, an exhaust tube, a drain tube, and a pressure relief tube. The steam box may be configured to regulate pressure within the cooking chamber by allowing the release of at least one of steam and liquid from the cooking chamber. The steam box may include a moveable deadweight; a holder configured to moveably hold the moveable deadweight; and a plurality of baffles, wherein each of the plurality of baffles may include a through hole, and wherein the holder may be configured to be positioned within the through hole of each of the plurality of baffles. The vent tube may connect the cooking chamber to the steam box, and may be configured to allow the release of the at least one of steam and liquid from the cooking chamber into the steam box. The exhaust tube may connect the cooking chamber to the steam box, and may be configured to allow the release of the at least one of steam and liquid from the cooking chamber into the steam box. The drain tube may be connected to the steam box, and may be configured to allow at least liquid to drain from the steam box. The pressure relief tube may be connected to the cooking chamber, and may be configured to allow the release of the at least one of steam and liquid from the cooking chamber to prevent the pressure within the cooking chamber from exceeding a predetermined pressure. In addition, a portion of the holder may be disposed outside of the steam box.

Other objects, features, and advantages of the present invention are apparent to persons of ordinary skill in the art in view of the following detailed description of embodiments of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Preferred embodiments of the present invention, and their features and advantages, may be understood by referring to FIGS. 1-9, like numerals being used for corresponding parts in the various drawings.

Figure 1:
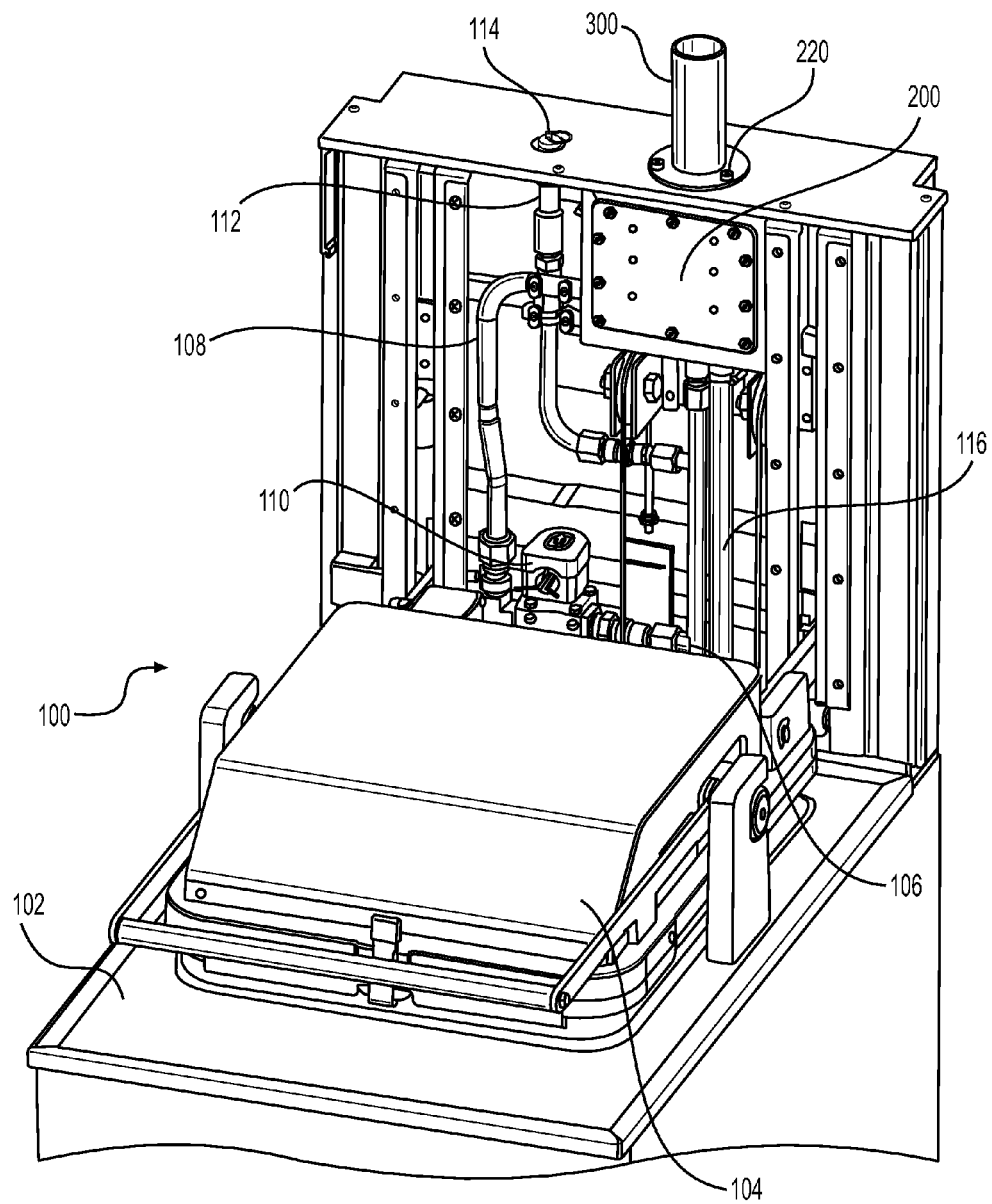
FIG. 1 is a perspective view of a fryer apparatus including a steam box and a deadweight assembly, according to an embodiment of the invention.
Figure 2:
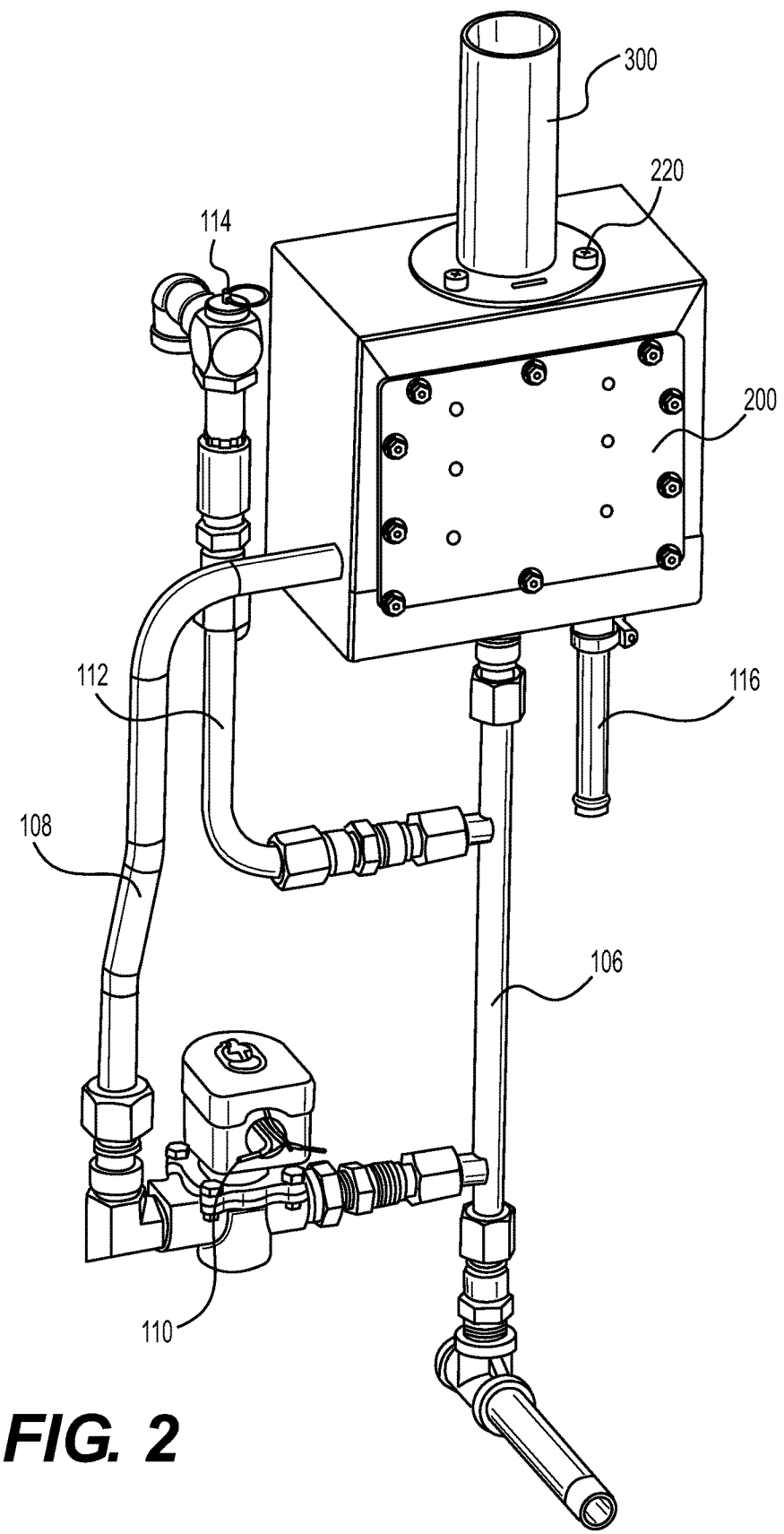
FIG. 2 is a perspective view of the outside of the steam box and the deadweight assembly, according to an embodiment of the invention.

FIG. 1 depicts a perspective view of the overall configuration of a fryer apparatus 100 including a steam box 200 and a deadweight assembly 300 (that comprises, e.g., a deadweight holder and a deadweight). FIG. 2 depicts a perspective view of the configuration of steam box 200, deadweight assembly 300, and associated tubes (discussed below). The configuration and use of fryer apparatus 100 will now be explained with reference to FIGS. 1 and 2.

Fryer apparatus 100 may include a cooking chamber 102 and a cover 104 that covers the cooking chamber 102. Fryer apparatus 100 may include a steam box 200 and a deadweight assembly 300. Steam box 200 may be configured to regulate pressure within cooking chamber 102 by allowing the release of vapor, steam, and/or liquid from cooking chamber 102. Steam box 200 will be explained in detail below.

Fryer apparatus 100 may include a vent tube 106 connecting cooking chamber 102 with steam box 200 and configured to release vapor, steam, and/or liquid into steam box 200 that may build in cooking chamber 102 during cooking. Fryer apparatus 100 may include an exhaust tube 108 connecting cooking chamber 102 with steam box 200 and configured to release vapor, steam, and/or liquid into steam box 200 that may build up in cooking chamber 102 during cooking. Specifically, exhaust tube 108 may be used to rapidly exhaust steam and pressure within cooking chamber 102 at the end of a cooking cycle. Exhaust tube 108 may include an exhaust tube valve 110. Exhaust tube valve 110 may be, for example, a solenoid valve assembly, or any other suitable valve assembly. In one embodiment, exhaust tube 108 may be connected to a vent tube 106 that is connected to cooking chamber 102.

Fryer apparatus 100 may include a pressure relief tube 112 connected to cooking chamber 102 and configured to release vapor, steam, and/or liquid from cooking chamber 102 when the pressure inside cooking chamber 102 exceeds a predetermined pressure. For example, the predetermined pressure may be a maximum pressure that can be tolerated by cooking chamber 102. In one embodiment, the maximum pressure that can be tolerated by cooking chamber 102 is 15 pounds per square inch (PSI). Pressure relief tube 112 may include a pressure relief valve 114. Pressure relief valve 114 may be any suitable valve, such as a check valve configured to release pressure at a predetermined threshold (e.g., 15 PSI). In one embodiment, pressure relief tube 112, exhaust tube 108, and vent tube 106 may all be connected to vent tube 106 that is connected to cooking chamber 102.

Fryer apparatus 100 may include a drain tube 116 connecting steam box 200 with a reservoir (not shown), and configured to drain condensate collected in steam box 200 to the reservoir. Drain tube 116 may be, for example, a rubber tube, a rubber tube connected to a metal tube, or any other suitable tube configuration.

Figure 3:
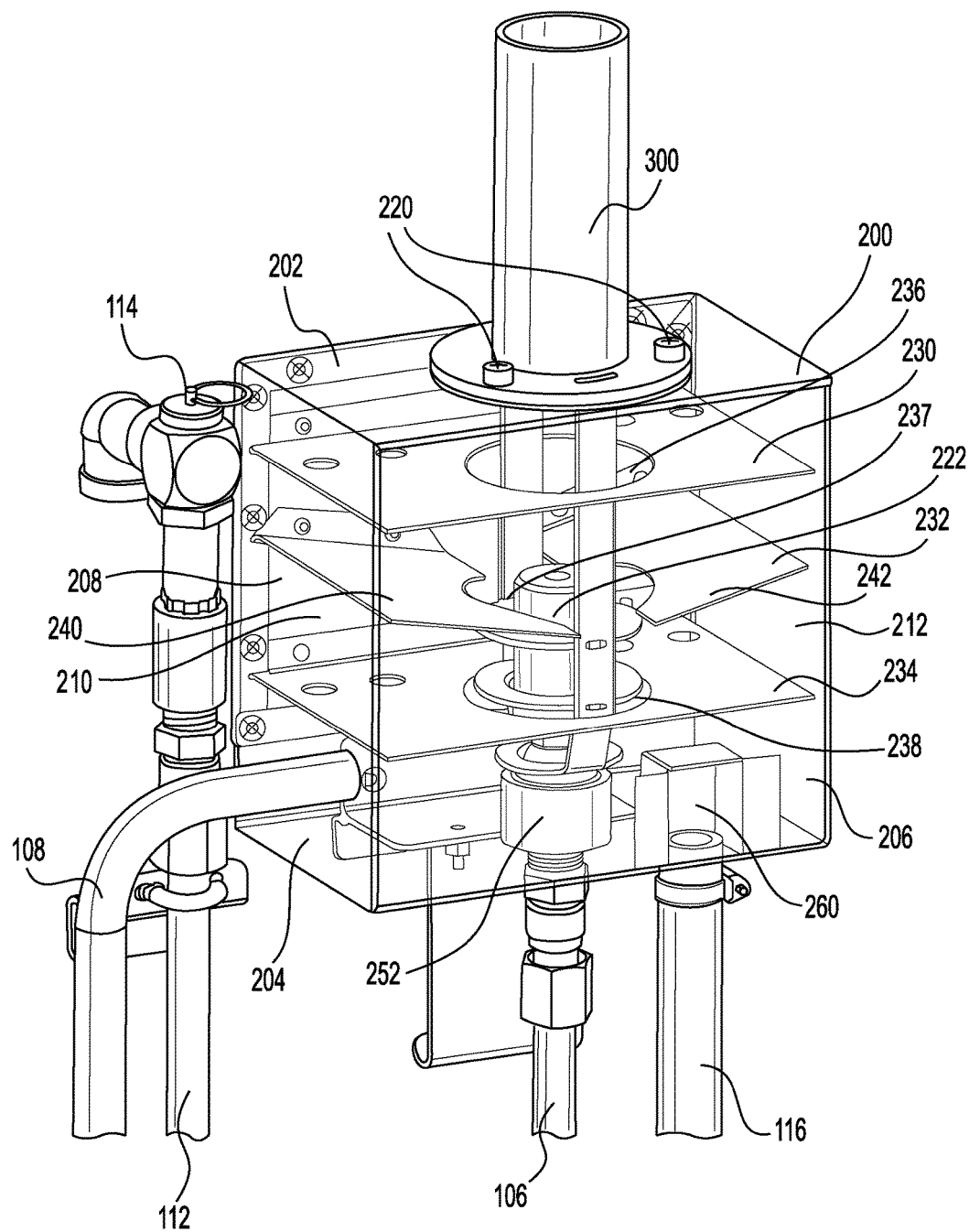
FIG. 3 is a front perspective view of the inside of the steam box and the deadweight assembly, according to an embodiment of the invention.
Figure 4:
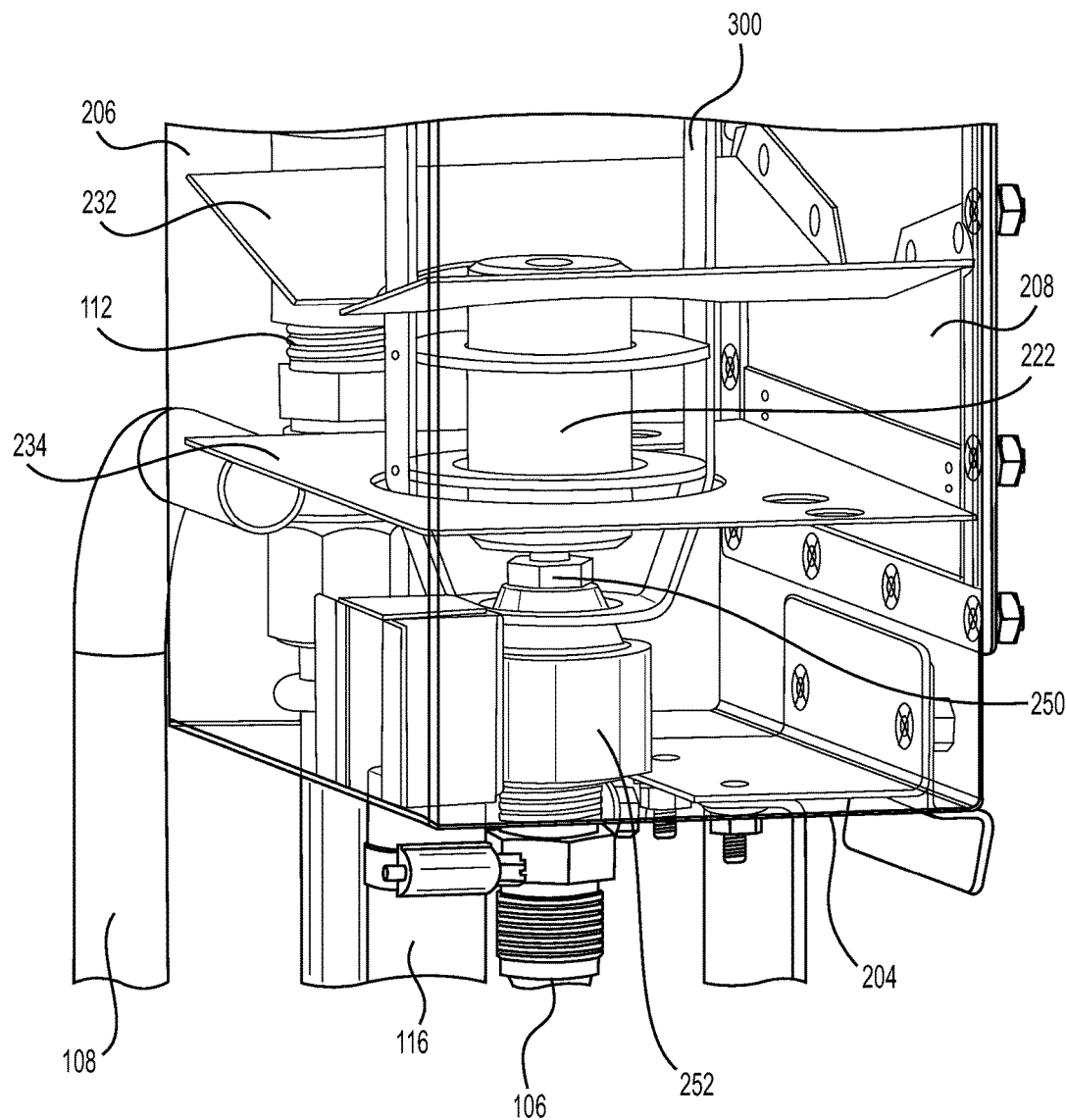
FIG. 4 is a side perspective view of the inside of the steam box and the deadweight assembly, according to an embodiment of the invention.

FIGS. 3 and 4 depict different perspective views of the inside of steam box 200 and the attached deadweight assembly 300. The configuration and use of steam box 200 and deadweight assembly 300 will now be explained with reference to FIGS. 3 and 4.

Steam box 200 may have a top surface 202, a bottom surface 204, a front surface 206, a back surface 208, and side surfaces 210, 212. Deadweight assembly 300 may be attached to steam box 200 at top surface 202. For example, deadweight assembly 300 may be attached to steam box 200 via fasteners 220 (also shown in FIGS. 1 and 2), which may be screws or other suitable fasteners. In one embodiment, one portion of deadweight assembly 300 may be disposed outside of steam box 200, and one portion of deadweight assembly 300 may be disposed inside steam box 200.

Deadweight assembly 300 is configured to permit movement of a moveable deadweight 222 therethrough. An orifice 250 (as shown in FIG. 4) may be located below deadweight 222 and configured to release vapor, steam, and/or liquid traveling through vent tube 106 into steam box 200. An adapter 252 may be used to connect orifice 250 to vent tube 106. During cooking, bottom plate 370 of deadweight assembly 300 may be configured to not contact deadweight 222 (i.e., there is always a clearance between deadweight 222 and bottom plate 370 when cooking apparatus 100 is in operation). The configuration of deadweight assembly 300 will be explained in more detail below.

In one embodiment, exhaust tube 108 may be attached to steam box 200 at side surface 210. Vent tube 106 and drain pipe 116 may be attached to the steam box 200 at bottom surface 204. Steam box 200 may be attached to cooking apparatus 100 at front surface 206 or back surface 208.

Steam box 200 may include baffles 230, 232, 234 configured to increase the surface area within steam box 200 to facilitate condensation. In one embodiment, top baffle 230 may be located closest to top surface 202 of steam box 200, middle baffle 232 may be located below baffle 230, and bottom baffle 234 may be located below middle baffle 232 and closest to bottom surface 204 of steam box 200.

Top baffle 230 may comprise a rectangular-shaped flat sheet, or any other suitable shape. Top baffle 230 may be parallel to top surface 202 of steam box 200. Top baffle 230 may be attached to back surface 208 of steam box 200, or any suitable surface. Top baffle 230 may have an opening 236 (i.e., a through hole) disposed at substantially a center of top baffle 230.

Middle baffle 232 may comprise more than one rectangular-shaped (or square-shaped, or any other suitable shape) flat sheets. In one embodiment, middle baffle 232 may comprise first baffle sheet 240 and second baffle sheet 242. First baffle sheet 240 may be angled at a first angle with respect to top surface 202 of steam box 200 such that a first side of first baffle sheet 240 disposed next to side surface 210 is closer to top surface 202 than a second side of first baffle sheet 240 opposite the first side and located close to the center of steam box 200. The second side of first baffle sheet 240 may have a semicircular cutout. Second baffle sheet 242 may be angled at a second angle with respect to top surface 202 of steam box 200 such that a first side of second baffle sheet 242 disposed next to side surface 212 is closer to top surface 202 than a second side of second baffle sheet 242 opposite the first side and located close to the center of steam box 200. The second side of second baffle sheet 242 may have a semicircular cutout. First baffle sheet 240 and second baffle sheet 242 may be disposed to be substantially in a "V" configuration in relation to bottom surface 204 of steam box 200. The first angle of first baffle sheet 240 may be substantially similar or the same as the second angle of second baffle sheet 242. The semicircular cutout on the second side of first baffle sheet 240 and the semicircular cutout on the second side of second baffle sheet 242 may form an opening 237 (i.e., a through hole) disposed at substantially a center of steam box 200. First baffle sheet 240 may disposed to not contact second baffle sheet 242. The angling of baffle sheets 240, 242 may facilitate removal of deadweight 222 from deadweight assembly 300.

Bottom baffle 234 may comprise a rectangular-shaped flat sheet, or any other suitable shape. Bottom baffle 234 may be parallel to top surface 202 of steam box 200. Bottom baffle 234 may be attached to back surface 208 of steam box 200, or any suitable surface. Bottom baffle 234 may have an opening 238 (i.e., a through hole) disposed at substantially a center of bottom baffle 234.

In one embodiment, top baffle 230, middle baffle 232, and bottom baffle 234 may be positioned relative to each other such that opening 236 in top baffle 230, the two semicircular cutouts in each of first baffle sheet 240 and second baffle sheet 242 (i.e., that form a circular shape in plan view) that comprise opening 237 of middle baffle 232, and opening 238 in bottom baffle 234 are substantially all the same size in plan view. In addition, opening 236, opening 237, and opening 238 may be configured to permit movement of deadweight assembly 300 therethrough. In other words, deadweight assembly 300 is configured to be positioned within the opening 236 of top baffle 230, opening 237 of middle baffle 232, and opening 238 of bottom baffle 234.

Steam box 200 may include a drain cover 260 which comprises a rectangular-shaped box configured to restrict vapor, steam and/or liquid exhaustion through drain pipe 116. Drain cover 260 may contact bottom surface 204 and front surface 206 of steam box 200. One end of drain pipe 116 may be disposed within drain cover 260 and/or attached to bottom surface 204 of steam box 200 below drain cover 260.

Figure 5:
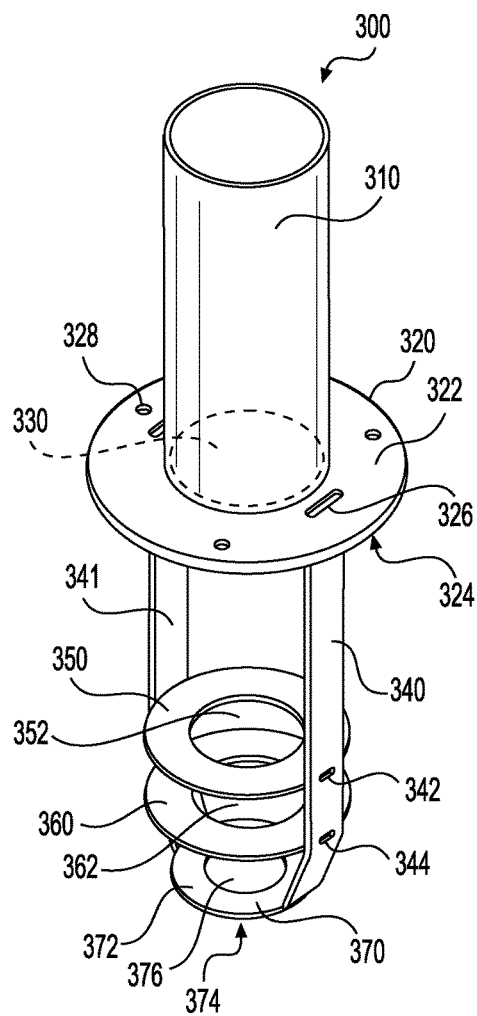
FIG. 5 is a perspective view of the deadweight assembly, according to an embodiment of the invention.
Figure 6:
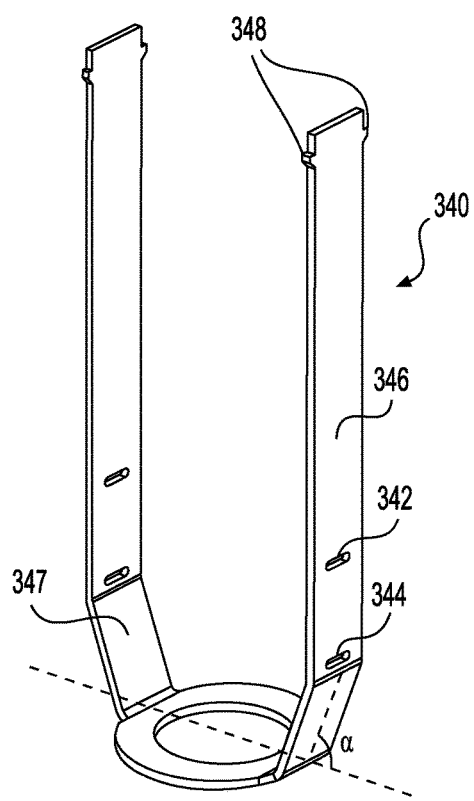
FIG. 6 is a perspective view of a support plate portion of the deadweight assembly, according to an embodiment of the invention.
Figure 7:
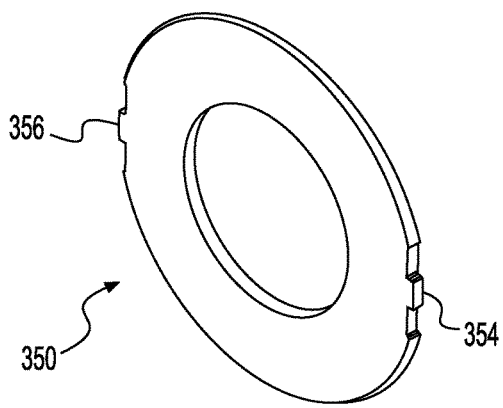
FIG. 7 is a perspective view of a guide plate portion of the deadweight assembly, according to an embodiment of the invention.

FIGS. 5-7 depict perspective views of an exemplary embodiment of deadweight assembly 300 without deadweight 222. The configuration and use of deadweight assembly 300 will now be explained with reference to FIGS. 5-7.

Deadweight assembly 300 may include an exhaust cylinder 310, a top plate 320, a plurality of support plates 340, 341 a plurality of guide plates 350, 360, and a bottom plate 370.

Top plate 320 may include a top surface 322 (e.g., a first surface) and a bottom surface 324 (e.g., a second surface). Top surface 322 may be opposite bottom surface 324. Top surface 322 may be substantially parallel to bottom surface 324. Top plate 320 may comprise a circular disc with an outer diameter. Top plate 320 may include a through hole 330 disposed at substantially a center of top plate 320 and configured to allow at least vapor, steam and/or liquid to pass therethrough. Top plate 320 may include a plurality of support plate attachment holes 326 configured to attach the plurality of support plates 340 to bottom surface 324 of top plate 320. For example, top plate 320 may include two support plate attachment holes 326. The two support plate attachment holes 326 may be disposed on opposite sides of exhaust cylinder 310 when exhaust cylinder 310 is attached to top plate 320.

The plurality of support plate attachment holes 326 may extend through top plate 320 from top surface 322 to bottom surface 324. A length of each of the plurality of support plate attachment holes 326 may be longer than a width of each of the plurality of support plate attachment holes 326.

Top plate 320 may include a plurality of fastener attachment portions 328 configured to attach the deadweight assembly 300 to steam box 200 via a plurality of fasteners 220 (FIGS. 2 and 3). For example, the plurality of fastener attachment portions 328 may comprise a plurality of screw holes (or other suitable attachment portions), and the plurality of fasteners 220 may comprise a plurality of screws (or other suitable fasteners). The plurality of screws may be threaded into the plurality of fastener attachment portions 328 such that they are retained by the plurality of fastener attachment portions 328 even when the deadweight assembly 300 is not attached to steam box 200. The plurality of fastener attachment portions 328 may be disposed along an outer edge of top plate 320. For example, top plate 320 may include three equally spaced fastener attachment portions 328.

Exhaust cylinder 310 may comprise a hollow cylindrical tube including a first end and a second end. Exhaust cylinder 310 may be attached to top surface 322 of top plate 320. Specifically, the first end of exhaust cylinder 310 may be attached to top surface 322 of top plate 320. For example, exhaust cylinder 310 may be welded onto top surface 322 of top plate 320. The plurality of fastener attachment portions 328 of top plate 320 may be disposed between exhaust cylinder 310 and the outer edge of top plate 320 when exhaust cylinder 310 is attached to top plate 320.

Each of the plurality of support plates 340, 341 may include a first portion 346 including a first end that is attached to and extends from bottom surface 324 of top plate 320 in a direction substantially perpendicular to bottom surface 324. First portion 346 may be a rectangular-shaped portion, or any other suitable shape. The first end of each of the plurality of support plates 340, 341 may be attached to each of the plurality of support plate attachment holes 326 of top plate 320. For example, the first end of each of the plurality of support plates 340, 341 may be welded to each of the plurality of support plate attachment holes 326.

The first end of each of the plurality of support plates 340 may include a pair of stops 348 configured to rest against bottom surface 324 of top plate 320 when the first end of each of the plurality of support plates 340 is inserted into each of the plurality support plate attachment holes 326. For example, each of the pair of stops 348 may comprise a projection that extends in a direction substantially parallel to bottom surface 324 of top plate 320. The projection may be located a distance from the first end of each of the plurality of support plates 340.

Each of the plurality of support plates 340, 341 may include a second portion 347 including a second end that is attached to bottom plate 370. For example, second portion 347 may be attached to an outer edge of bottom plate 370. Second portion 347 may be a rectangular-shaped portion, or any other suitable shape. In one embodiment, the plurality of support plates 340, 341 may comprise a first support plate 340 and a second support plate 341. Second support plate 341 may be attached to the outer edge of bottom plate 370 at a position opposite first support plate 340. In one embodiment, bottom plate 370 and the plurality of support plates 340, 341 are formed to be a single, connected piece. In another embodiment, bottom plate 370 and the plurality of support plates 340, 341 are formed of separate, distinct pieces.

Second portion 347 may be bent at an angle relative to first portion 346 and bottom plate 370. Second portion 347 of each of the plurality of support plates 340 may be bent toward a center of top plate 320. Second portion 347 may be bent at an angle a relative to bottom plate 370 (FIG. 6), and angle a may depend on the overall configuration of deadweight assembly 300, steam box 200, and/or cooking apparatus 100. For example, in FIG. 6, angle a is between 45° and 90°, and more specifically, about 70°.

In one embodiment, each of the plurality of support plates 340, 341 may include a plurality of guide plate attachment holes 342, 344 disposed along a length of each of the plurality of support plates 340 and configured to be used to attach each of the plurality of guide plates 350, 360. Each of the plurality of guide plate attachment holes 342, 344 may be disposed to be substantially parallel to bottom plate 370. In one embodiment, the length of each of the plurality of support plates 340, 341 may be greater than a width of each of the plurality of support plates 340, 341.

The plurality of guide plates 350, 360 may be disposed between top plate 320 and bottom plate 370, and configured to permit movement of deadweight 222 therethrough (FIGS. 3 and 4). Each of the plurality of guide plates 350, 360 may be attached to the plurality of support plates 340 via the plurality of guide plate attachment holes 342, 344. For example, each of the plurality of guide plates 350, 360 may be welded to the plurality of support plates 340 via the plurality of guide plate attachment holes 340, 341. In one embodiment, each of the plurality of guide plates 350, 360 comprises a first tab 356 and a second tab 354 configured to be mated with each of the plurality of guide plate attachment holes 342, 344 disposed on each of the plurality of support plates 340, 341. First tab 356 and second tab 354 may be disposed on an outer edge of each of the plurality of guide plates 350, 360. First tab 356 may be disposed at a position opposite to second tab 354. First tab 356 and second tab 354 may each comprise a projection disposed on the outer edge of each of the plurality of guide plates 350, 360.

The plurality of guide plates 350, 360 may comprise a first guide plate 350 and a second guide plate 360. First guide plate 350 may be disposed to be closer to top plate 320 than second guide plate 360. First guide plate 350 may comprise a first disc that includes a first through hole 352 disposed at substantially a center of first guide plate 350. First guide plate 350 may include a first outer diameter and a first through-hole diameter. Second guide plate 360 may comprise a second disc that includes a second through hole 362 disposed at substantially a center of second guide plate 360. Second guide plate 360 may include a second outer diameter and a second through-hole diameter. The first outer diameter may be substantially equal to the second outer diameter. The first through-hole diameter may be smaller than the second through-hole diameter. This configuration may have numerous advantages. For example, first guide plate 350 has the advantage of being capable of holding deadweight 222 in a substantially vertical position due to the smaller through-hole diameter, and thus closer clearance around deadweight 222 (FIG. 4). In addition, second guide plate 360 has the advantage of acting as a guiderail to prevent deadweight 222 from falling out of deadweight assembly 300.

Bottom plate 370 may include a top surface 372 (e.g., third surface) and a bottom surface 374 (e.g., fourth surface). Top surface 372 may be opposite bottom surface 374. Top surface 372 may be substantially parallel to bottom surface 374. Top surface 372 of bottom plate 370 may be substantially parallel to top surface 322 of top plate 320. Bottom surface 374 of bottom plate 370 may be substantially parallel to bottom surface 324 of top plate 320.

Bottom plate 370 may comprise a circular disc with an outer diameter. Bottom plate 370 may comprise a bottom plate through hole 376 which is configured to surround but not contact adapter 252 below orifice 250 (FIG. 4). The outer diameter of bottom plate 370 may be smaller than the outer diameter of top plate 320. The outer diameter of bottom plate 370 may be smaller than the first outer diameter of first guide plate 350, and smaller than the second outer diameter of second guide plate 360.

As shown in FIGS. 5-7, deadweight assembly 300 may be manufactured as a welded assembly made from separate fabricated parts. For example, this fabricated version may combine a mixture of 201 and 304 Stainless Steel parts.

An advantage of the above-discussed configuration includes decreasing the surface area and contract area between the circuit discs and the deadweight of a deadweight assembly (e.g., by using two thin, circular discs comprising guide plate 350 and guide plate 360), resulting in lower adhesion of the deadweight to the deadweight assembly, less build-up of congealed and constricting oil and/or grease around the deadweight, and decreased lateral travel of the deadweight. This configuration may help prevent the deadweight from seizing, or binding to the deadweight assembly, and therefore ceasing to function.

Another advantage of the above-discussed configuration is that guide plate 350 has a smaller through-hole diameter, resulting in a configuration that may be capable of holding a deadweight in a substantially vertical position by providing a closer clearance around the deadweight, and being capable of self-cleaning due to the inner edge around through-hole 352 being capable of scraping the surface of the deadweight as it moves within the deadweight assembly. As a result, less build-up of congealed oil and/or grease is accumulated on the surface of the deadweight.

Another advantage of the above-discussed configuration is that deadweight assembly 300 allows for easy removal of deadweight 222 and deadweight assembly 300 from cooking apparatus 100 for cleaning.

Figure 8:
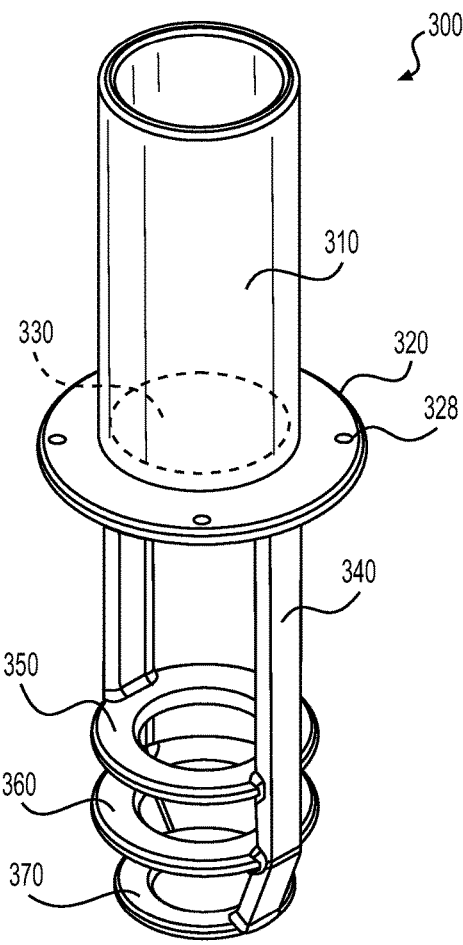
FIG. 8 is a perspective view of a deadweight assembly, according to an embodiment of the invention.
Figure 9:
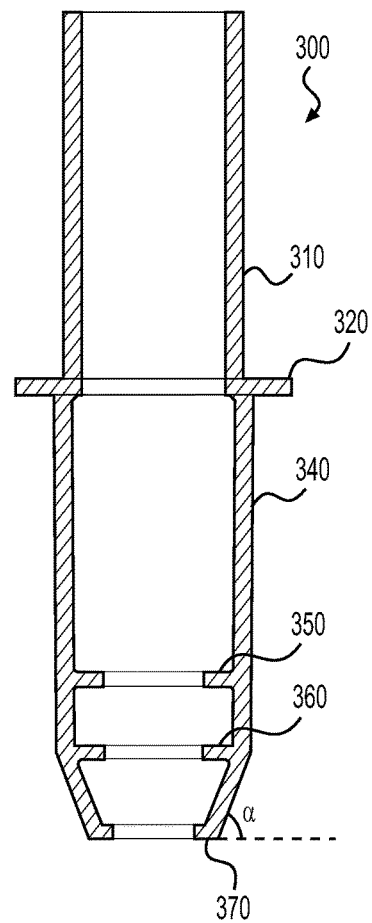
FIG. 9 is a diagram of a deadweight assembly, according to an embodiment of the invention.

FIGS. 8 and 9 depict perspective views of another exemplary embodiment of deadweight assembly 300. Similar components to the embodiment of FIGS. 5-7 are labeled with the same reference numbers, and therefore are not discussed herein. FIGS. 8 and 9 depict a deadweight assembly 300 that may be manufactured by casting the entire structure as a whole using, for example, aluminum casting. More specifically, for example, the cast version may be A356-T6 aluminum.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:
1. A holder configured to hold a deadweight within a steam box of a cooking apparatus, the holder comprising:
   a top plate, including:
      a through hole disposed at substantially a center of the top plate, the through hole being configured to allow at least one of liquid and steam to pass therethrough,
      a first surface, and a second surface, the first surface being opposite the
second surface;
an exhaust cylinder attached to the first surface of the top
plate;
a bottom plate;
a plurality of support plates, including:
a first end of each of the plurality of support plates that
is attached to and extends from the second surface of
the top plate in a direction substantially perpendicular to the second surface, and
a second end of each of the plurality of support plates
that is attached to the bottom plate; and
a plurality of guide plates disposed between the top plate
and the bottom plate, each of the plurality of guide
plates attached to the plurality of support plates,
wherein the bottom plate includes a third surface and a
fourth surface, the third surface being opposite of the
fourth surface,
wherein the third surface of the bottom plate is substantially parallel to the first surface of the top plate,
wherein an outer diameter of the bottom plate is smaller
than an outer diameter of the top plate and an outer
diameter of each of the plurality of guide plates,
wherein the plurality of guide plates are configured to
permit movement of the deadweight therethrough,
wherein the top plate further includes a plurality of
attachment holes configured to attach the plurality of
support plates to the second surface of the top plate,
wherein the plurality of attachment holes extends through
the top plate from the first surface to the second surface,
wherein each of the plurality of support plates is attached
to an outer edge of the bottom plate, the outer edge of
the bottom plate defining the outer diameter of the
bottom plate, and each of the plurality of support plates
is also attached to an outer edge of each of the plurality
of guide plates, the outer edge of each guide plate
defining the outer diameter of the corresponding guide
plate, and
wherein each of the plurality of support plates includes a
first portion and a second portion that is bent at an angle
relative to the first portion,
wherein each of the plurality of support plates includes a
plurality of guide plate attachment holes disposed along
the length of each of the plurality of support plates,
wherein the first end of each of the plurality of support
plates includes the first portion, which is attached to
and extends from the second surface of the top plate in
the direction substantially perpendicular to the second
surface of the top plate, and
wherein the second end of each of the plurality of support
plates includes the second portion that is bent at an
angle relative to the first portion.

2. The holder according to claim 1,
wherein the exhaust cylinder comprises a hollow cylindrical tube including a first end and a second end, and
wherein the first end of the exhaust cylinder is attached to
the first surface of the top plate.

3. The holder according to claim 2, wherein the exhaust cylinder is welded onto the first surface of the top plate.

4. The holder according to claim 2,
wherein the top plate comprises a circular disc,
wherein the exhaust cylinder has a diameter, and
wherein the outer diameter of the top plate is larger than
the diameter of the exhaust cylinder.

5. The holder according to claim 1, wherein the plurality of attachment holes are disposed between the exhaust cylinder and an outer edge of the top plate when the exhaust cylinder is attached to the top plate.

6. The holder according to claim 1, wherein the first end of each of the plurality of support plates is welded to each of the plurality of attachment holes.

7. The holder according to claim 1,
wherein the top plate further includes a plurality of
attachment portions configured to attach the holder to
the steam box via fasteners, and
wherein the plurality of attachment portions are disposed
along an outer edge of the top plate.

8. The holder according to claim 7,
wherein the plurality of attachment portions comprises a
plurality of screw holes configured to attach the holder
to the steam box via a plurality of screws, which define
fasteners.

9. The holder according to claim 1, wherein the second portion on the second end of each of the plurality of support plates is disposed to be bent toward a center of the top plate.

10. The holder according to claim 9,
wherein the plurality of support plates comprises a first
support plate and a second support plate, and
wherein the second support plate is attached to the outer
edge of the bottom plate at a position opposite the first
support plate.

11. The holder according to claim 1,
wherein the bottom plate comprises a circular disc.

12. The holder according to claim 1,
wherein each of the plurality of guide plates comprises a
first tab and a second tab, each of the first tab and the
second tab being configured to be mated with each of
the plurality of guide plate attachment holes disposed
on each of the plurality of support plates,
wherein the first tab and the second tab are disposed on
the outer edge of each of the plurality of guide plates,
and
wherein the first tab is disposed to be opposite the second
tab.

13. A holder configured to hold a deadweight within a steam box of a cooking apparatus, the holder comprising:
a top plate, including:
a through hole disposed at substantially a center of the
top plate, the through hole being configured to allow
at least one of liquid and steam to pass therethrough,
a first surface, and
a second surface, the first surface being opposite the
second surface;
an exhaust cylinder attached to the first surface of the top
plate;
a bottom plate;
a plurality of support plates, including:
a first end of each of the plurality of support plates that
is attached to and extends from the second surface of
the top plate in a direction substantially perpendicular to the second surface, and
a second end of each of the plurality of support plates
that is attached to the bottom plate; and
a plurality of guide plates disposed between the top plate
and the bottom plate, each of the plurality of guide
plates attached to the plurality of support plates,
wherein the bottom plate includes a third surface and a
fourth surface, the third surface being opposite of the
fourth surface,
wherein the third surface of the bottom plate is substantially parallel to the first surface of the top plate, wherein an outer diameter of the bottom plate is smaller than an outer diameter of the top plate and an outer diameter of each of the plurality of guide plates, wherein the plurality of guide plates are configured to permit movement of the deadweight therethrough, wherein the top plate further includes a plurality of attachment holes configured to attach the plurality of support plates to the second surface of the top plate, wherein the plurality of attachment holes extends through the top plate from the first surface to the second surface, and wherein the first end of each of the plurality of support plates includes a pair of stops configured to rest against the second surface of the top plate when the plurality of support plates are attached to the second surface of the top plate.

14. A holder configured to hold a deadweight within a steam box of a cooking apparatus, the holder comprising:

a top plate, including:
    a through hole disposed at substantially a center of the top plate, the through hole being configured to allow at least one of liquid and steam to pass therethrough,
    a first surface, and
    a second surface, the first surface being opposite the second surface;

an exhaust cylinder attached to the first surface of the top plate;

a bottom plate;

a plurality of support plates, including:
    a first end of each of the plurality of support plates that is attached to and extends from the second surface of the top plate in a direction substantially perpendicular to the second surface, and
    a second end of each of the plurality of support plates that is attached to the bottom plate; and a plurality of guide plates disposed between the top plate and the bottom plate, each of the plurality of guide plates attached to the plurality of support plates, wherein the bottom plate includes a third surface and a fourth surface, the third surface being opposite of the fourth surface, wherein the third surface of the bottom plate is substantially parallel to the first surface of the top plate, wherein an outer diameter of the bottom plate is smaller than an outer diameter of the top plate and an outer diameter of each of the plurality of guide plates, wherein the plurality of guide plates are configured to permit movement of the deadweight therethrough, wherein the top plate further includes a plurality of attachment holes configured to attach the plurality of support plates to the second surface of the top plate, wherein the plurality of attachment holes extends through the top plate from the first surface to the second surface, wherein the plurality of guide plates comprises a first guide plate and a second guide plate, the first guide plate being disposed to be closer to the top plate than the second guide plate, wherein the first guide plate comprises a first guide disc that includes a first through hole disposed at substantially a center of the first guide disc, the first through hole having a first through-hole diameter, wherein the second guide plate comprises a second guide disc that includes a second through hole disposed at substantially a center of the second guide disc, the second through hole having a second through-hole diameter, and wherein the first through-hole diameter is smaller than the second through-hole diameter.

15. The holder according to claim 14, wherein the outer diameter of the first guide disc is equal to the outer diameter of the second guide disc, and wherein the outer diameter of the second guide disc is greater than the outer diameter of the bottom plate.

\* \* \* \* \*